US012770814B2

(12) United States Patent
Yamauchi et al.

(10) Patent No.: US 12,770,814 B2
(45) Date of Patent: Oct. 20, 2026

(54) ELECTROMAGNETIC RELAY TO REDUCE A DECREASE IN INSULATION BETWEEN FIXED TERMINALS CAUSED BY WEAR PARTICLES

(71) Applicant: OMRON Corporation, Kyoto (JP)

(72) Inventors: Hideto Yamauchi, Kyoto (JP); Kazuhiro Tsutsui, Kyoto (JP); Hiroki Kawarasaki, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 221 days.

(21) Appl. No.: 18/764,381

(22) Filed: Jul. 5, 2024

(65) Prior Publication Data

US 2025/0046554 A1 Feb. 6, 2025

(30) Foreign Application Priority Data

Jul. 31, 2023 (JP) ................................ 2023-124687

(51) Int. Cl.
*H01H 50/44* (2006.01)
*H01H 50/54* (2006.01)

(52) U.S. Cl.
CPC ............ *H01H 50/44* (2013.01); *H01H 50/54* (2013.01)

(58) Field of Classification Search
None
See application file for complete search history.

(56) References Cited

U.S. PATENT DOCUMENTS

| | | | | |
|---|---|---|---|---|
| 4,533,889 A * | 8/1985 | Knight | H01H 50/14 | |
| | | | 439/444 | |
| 4,745,382 A * | 5/1988 | Dittmann | H01H 50/021 | |
| | | | 335/78 | |
| 2018/0047537 A1 | 2/2018 | Sasaki et al. | | |
| 2025/0046553 A1* | 2/2025 | Yamauchi | H01H 50/14 | |
| 2025/0046555 A1* | 2/2025 | Yamauchi | H01H 50/023 | |

FOREIGN PATENT DOCUMENTS

JP 6344282 B2 6/2018

* cited by examiner

*Primary Examiner* — Bernard Rojas
(74) *Attorney, Agent, or Firm* — SHINJYU GLOBAL IP

(57) ABSTRACT

An electromagnetic relay includes a first fixed terminal, a second fixed terminal, a housing, a coil, and a spool. The second fixed terminal is disposed in front of the first fixed terminal and faces the first fixed terminal. The housing includes a side surface that laterally covers the first fixed terminal and the second fixed terminal. The coil is wound around the spool. The spool includes a support portion and a lateral wall portion. The support portion supports the first fixed terminal. The lateral wall portion extends from the support portion and is disposed between the first fixed terminal and the side surface of the housing in the left-right direction. The front end of the lateral wall portion is located between the first fixed terminal and the second fixed terminal in the front-rear direction.

7 Claims, 18 Drawing Sheets

ELECTROMAGNETIC RELAY TO REDUCE A DECREASE IN INSULATION BETWEEN FIXED TERMINALS CAUSED BY WEAR PARTICLES

CROSS-REFERENCE TO RELATED APPLICATION

This application claims priority to Japanese Patent Application No. 2023-124687, filed Jul. 31, 2023. The contents of that application are incorporated by reference herein in their entirety.

FIELD

The claimed invention relates to an electromagnetic relay.

BACKGROUND

Some electromagnetic relays have a pair of fixed terminals arranged opposite each other. Furthermore, the side surfaces of the housing are disposed on the sides of the pair of fixed terminals (see, for example, Japanese Patent No. 6344282).

SUMMARY

In an electromagnetic relay, moving parts such as contacts generate wear particles or consumable particles (hereinafter referred to as wear particles and the like). When such wear particles accumulate along the side surface of the housing beside the fixed terminals, the insulation between the fixed terminals is reduced through the wear particles and the like. Increasing the distance between the fixed terminals and the side surface of the housing improves the insulation between the fixed terminals. In that case, however, the electromagnetic relay becomes large in size. An object of the claimed invention is to limit or reduce a decrease in insulation between fixed terminals caused by wear particles and the like that accumulate inside an electromagnetic relay while limiting or reducing an increase in size of the electromagnetic relay.

An electromagnetic relay in accordance with the claimed invention includes a first fixed terminal, a second fixed terminal, a housing, a coil, and a spool. The second fixed terminal is disposed in front of the first fixed terminal and faces the first fixed terminal. The housing includes a side surface that laterally covers the first fixed terminal and the second fixed terminal. The coil is wound around the spool. The spool includes a support portion and a lateral wall portion. The support portion supports the first fixed terminal. The lateral wall portion extends from the support portion and is disposed between the first fixed terminal and the side surface of the housing in the left-right direction. A front end of the lateral wall portion is located between the first fixed terminal and the second fixed terminal in the front-rear direction.

In the electromagnetic relay according to the disclosed embodiment, the creepage distance between the first fixed terminal and the second fixed terminal is increased by the thickness of the lateral wall portion. This prevents the electromagnetic relay from becoming too large, while also preventing a decrease in insulation between the fixed terminals caused by wear particles and the like that accumulate inside the electromagnetic relay.

The electromagnetic relay may further include a first fixed contact and a second fixed contact. The first fixed contact may be provided on the first fixed terminal. The second fixed contact may be provided on the second fixed terminal and disposed to face the first fixed terminal. The front end of the lateral wall portion may be located between the first fixed contact and the second fixed contact in the front-rear direction. In this case, deterioration of the insulation between the fixed contacts is suppressed.

The support portion may be located at the same height as a central axis of the coil. In this case, the first fixed terminal is supported by the support portion at a position above and away from wear particles and the like that accumulate inside the electromagnetic relay. Therefore, even if the portion of the first fixed terminal that is supported by the support portion is large, deterioration in insulation is suppressed.

The lateral wall portion may extend downward from the support portion. In this case, the lateral wall portion prevents the insulation from decreasing below the support portion. The support portion may be longer than the lateral wall portion in the front-rear direction. In this case, the first fixed terminal is stably supported by the supporting portion.

A clearance may be provided between the side surface of the housing and the lateral wall portion. In this case, the creepage distance between the first fixed terminal and the second fixed terminal is further increased. This improves the insulation between the fixed terminals. The lateral wall portion may include an opening. In this case, wear particles and the like can be released through the opening. This suppresses deterioration of the insulation between the fixed terminals.

The spool may include a bent portion that protrudes from the lateral wall portion toward a position between the first fixed terminal and the second fixed terminal. In this case, the bent portion prevents wear particles and the like from scattering forward. This improves the insulation between the fixed terminals.

The electromagnetic relay may further include a coil terminal. The coil terminal may include a body portion and a tie-down portion. The body portion may be supported on the spool. The tie-down portion may extend from the body portion toward the first fixed terminal, with an end of the coil being connected to the tie-down portion to electrically connect the coil to the coil terminal. The spool may include a vertical wall portion. The vertical wall portion may be located between the first fixed terminal and the tie-down portion in the front-rear direction. The lateral wall portion may extend forward from the vertical wall portion. In this case, the vertical wall portion and the lateral wall portion increase the insulation distance between the first fixed terminal and the tie-down portion. This improves the insulation between the first fixed terminal and the tie-down portion.

DETAILED DESCRIPTION

Figure 1:
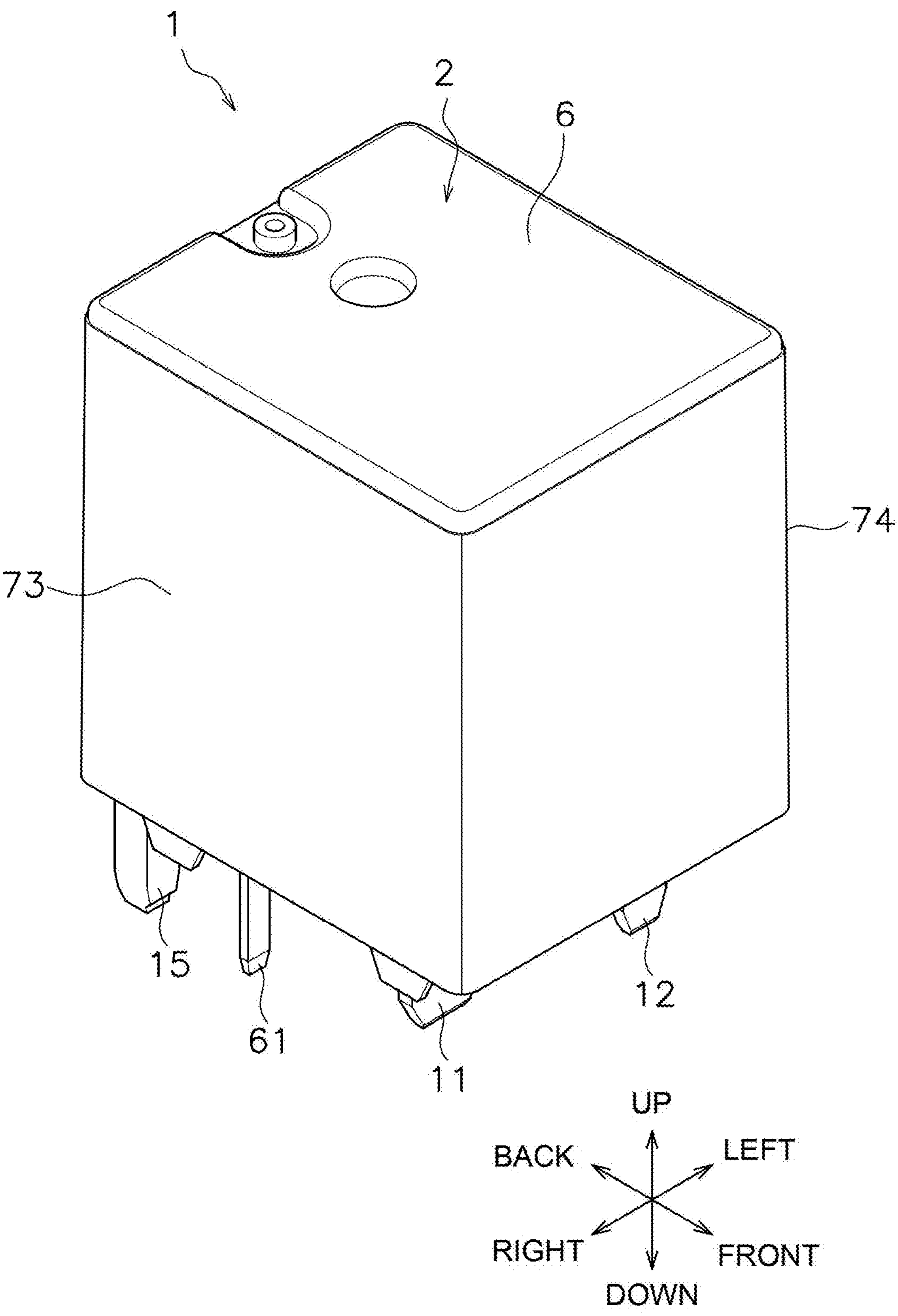
FIG. 1 is a perspective view of an embodiment of an electromagnetic relay in accordance with the claimed invention.
Figure 2:
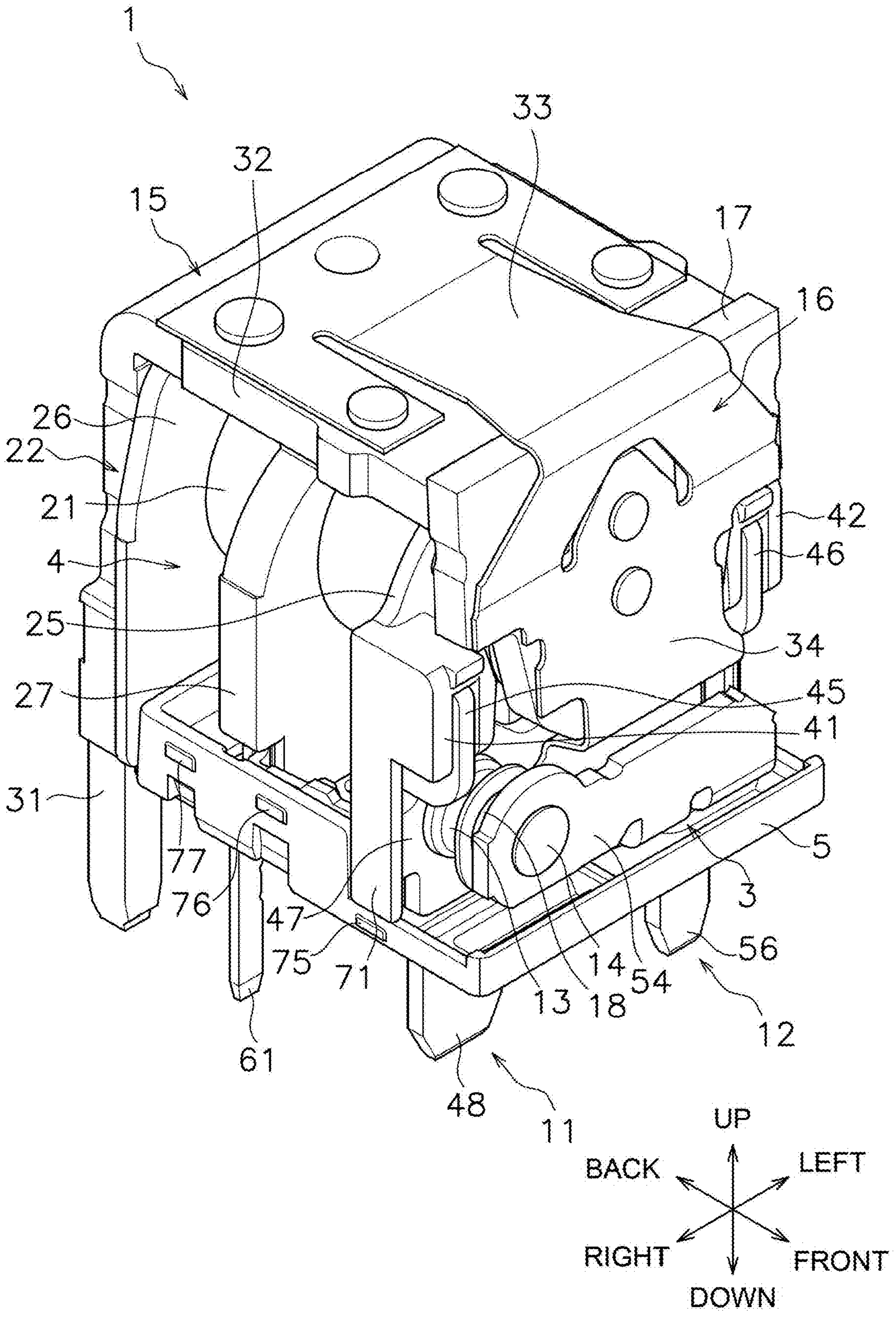
FIG. 2 is a perspective view of the embodiment of an electromagnetic relay in accordance with the claimed invention.
Figure 3:
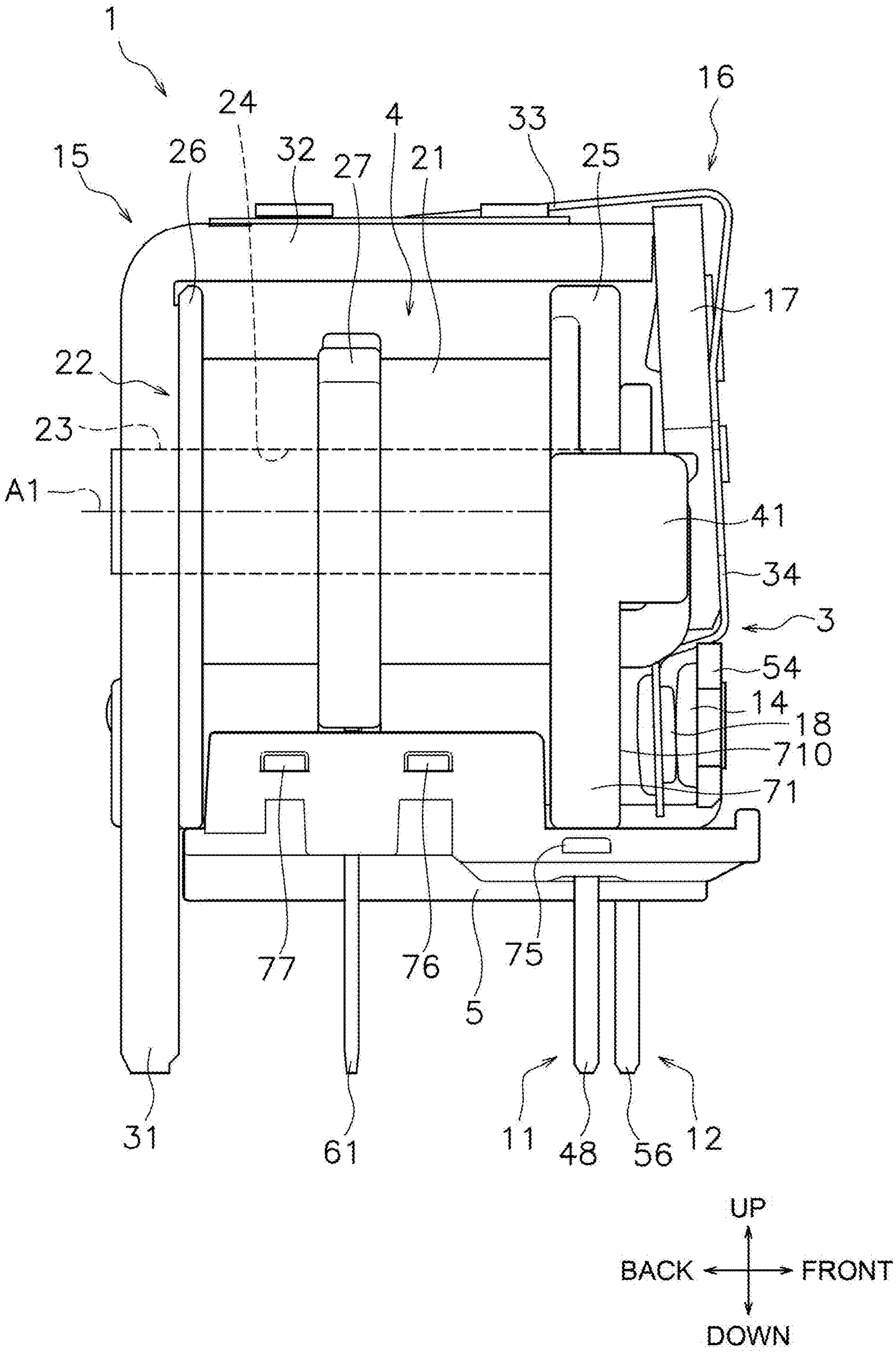
FIG. 3 is a side view of the electromagnetic relay.

Hereinafter, an exemplary embodiment of an electromagnetic relay in accordance with the claimed invention will be described with reference to the drawings. FIGS. 1 and 2 are perspective views of an embodiment of such an electromagnetic relay 1. FIG. 3 is a side view of the electromagnetic relay 1. As shown in FIGS. 1 to 3, the electromagnetic relay 1 includes a housing 2, a contact device 3, and a drive device 4. The contact device 3 and the drive device 4 are disposed within the housing 2.

The housing 2 includes a base 5 and a case 6. The base 5 supports the drive device 4. The case 6 is attached to the base 5 and covers the drive device 4 and the contact device 3. The base 5 and the case 6 are made of an insulating material such as resin. Alternatively, the base 5 and case 6 may be made of other insulating materials, such as ceramic. It should be noted that the case 6 is omitted in FIGS. 2 and 3.

The contact device 3 includes a first fixed terminal 11, a second fixed terminal 12, a first fixed contact 13, a second fixed contact 14, a common terminal 31, a movable piece 16, an armature 17, and a movable contact 18. The first fixed terminal 11, the second fixed terminal 12, the first fixed contact 13, the second fixed contact 14, the movable contact 18, the common terminal 31, and the movable piece 16 are made of a conductive metal. The armature 17 is made of a magnetic material.

In the following description, the direction in which the second fixed contact 14 is disposed relative to the first fixed contact 13 is defined as the "front", and the opposite direction is defined as the "rear". The direction in which the contact device 3 and the drive device 4 are disposed with respect to the base 5 is defined as "upper", and the opposite direction is defined as "lower". Additionally, the left and right directions facing forward are defined as "left" and "right", respectively. However, these directions are defined for the convenience of explanation and do not limit the direction in which the electromagnetic relay 1 is used.

The drive device 4 operates the contact device 3 by electromagnetic force. The drive device 4 includes a coil 21, a spool 22, a yoke 15, and an iron core 23. The coil 21 is wound around a spool 22. The spool 22 is supported by the base 5. As shown in FIG. 3, the spool 22 and the coil 21 are disposed so that the central axis A1 of the coil 21 faces the front-rear direction. The spool 22 includes a hole 24. The hole 24 extends in the front-rear direction. The iron core 23 is disposed within a hole 24 in the spool 22.

The iron core 23 is connected to the yoke 15.

The spool 22 is made of an insulating material such as resin. The spool 22 includes a first flange 25, a second flange 26, and a central flange 27. The first flange 25, the second flange 26, and the central flange 27 protrude in the radial direction of the coil 21. The first flange 25 is located at the front end of the spool 22. The second flange 26 is located at the rear end of the spool 22. The central flange 27 is disposed between the first flange 25 and the second flange 26 in the front-rear direction. The first flange 25 faces the first fixed terminal 11. The second flange 26 faces the common terminal 31. The central flange 27 is disposed between the first fixed terminal 11 and the common terminal 31.

A portion of the first fixed terminal 11 protrudes from the base 5 to the exterior of the electromagnetic relay 1. The first fixed terminal 11 is supported by the spool 22. The first fixed terminal 11 is disposed in front of the coil 21. The first fixed terminal 11 is disposed in front of the first flange 25. The first fixed terminal 11 is attached to the first flange 25. The first fixed contact 13 is provided on the first fixed terminal 11.

A portion of the second fixed terminal 12 protrudes from the base 5 to the exterior of the electromagnetic relay 1. The second fixed terminal 12 is supported by the spool 22. The second fixed terminal 12 is disposed in front of the coil 21. The second fixed terminal 12 is disposed in front of the first fixed terminal 11. The second fixed terminal 12 is attached to the central flange 27. The second fixed contact 14 is provided on the second fixed terminal 12.

A portion of the common terminal 31 protrudes from the base 5 to the exterior of the electromagnetic relay 1. The common terminal 31 is integrated with the yoke 15. The common terminal 31 is supported by the spool 22 via the yoke 15. The common terminal 31 is disposed behind the coil 21. The common terminal 31 is disposed behind the second flange 26. The common terminal 31 is attached to the second flange 26 via the yoke 15.

The common terminal 31 extends in the vertical direction. The lower end of the common terminal 31 protrudes downward from the base 5. The yoke 15 extends upward from the common terminal 31 and has an L-shaped bent shape. The yoke 15 includes a horizontal portion 32. The horizontal portion 32 extends in the front-rear direction. The horizontal portion 32 is disposed above the spool 22. The horizontal portion 32 is disposed above the first flange 25, the second flange 26, and the central flange 27.

The movable piece 16 is connected to the common terminal 31 via the yoke 15. The movable contact 18 is provided on the movable piece 16. The movable piece 16 has a spring property. The movable piece 16 includes a leaf spring portion 33 and a movable support portion 34. The movable piece 16 has a bent shape between the leaf spring portion 33 and the movable support portion 34. The leaf spring portion 33 is disposed above the horizontal portion 32 of the yoke 15. The leaf spring portion 33 is fixed to the horizontal portion 32. The movable support portion 34 is disposed in front of the spool 22. The movable support portion 34 extends in the vertical direction. The lower portion of the movable support portion 34 is disposed between the first fixed terminal 11 and the second fixed terminal 12. The movable contact 18 is provided at the lower portion of the movable support portion 34. The movable contact 18 is disposed between the first fixed terminal 11 and the second fixed terminal 12 in the front-rear direction.

The armature 17 is attached to the movable piece 16. The armature 17 is disposed in front of the spool 22. The armature 17 is disposed between the movable support portion 34 of the movable piece 16 and the iron core 23. The armature 17 is attached to the movable support portion 34. The upper portion of the armature 17 is in contact with the horizontal portion 32 of the yoke 15.

Figure 4:
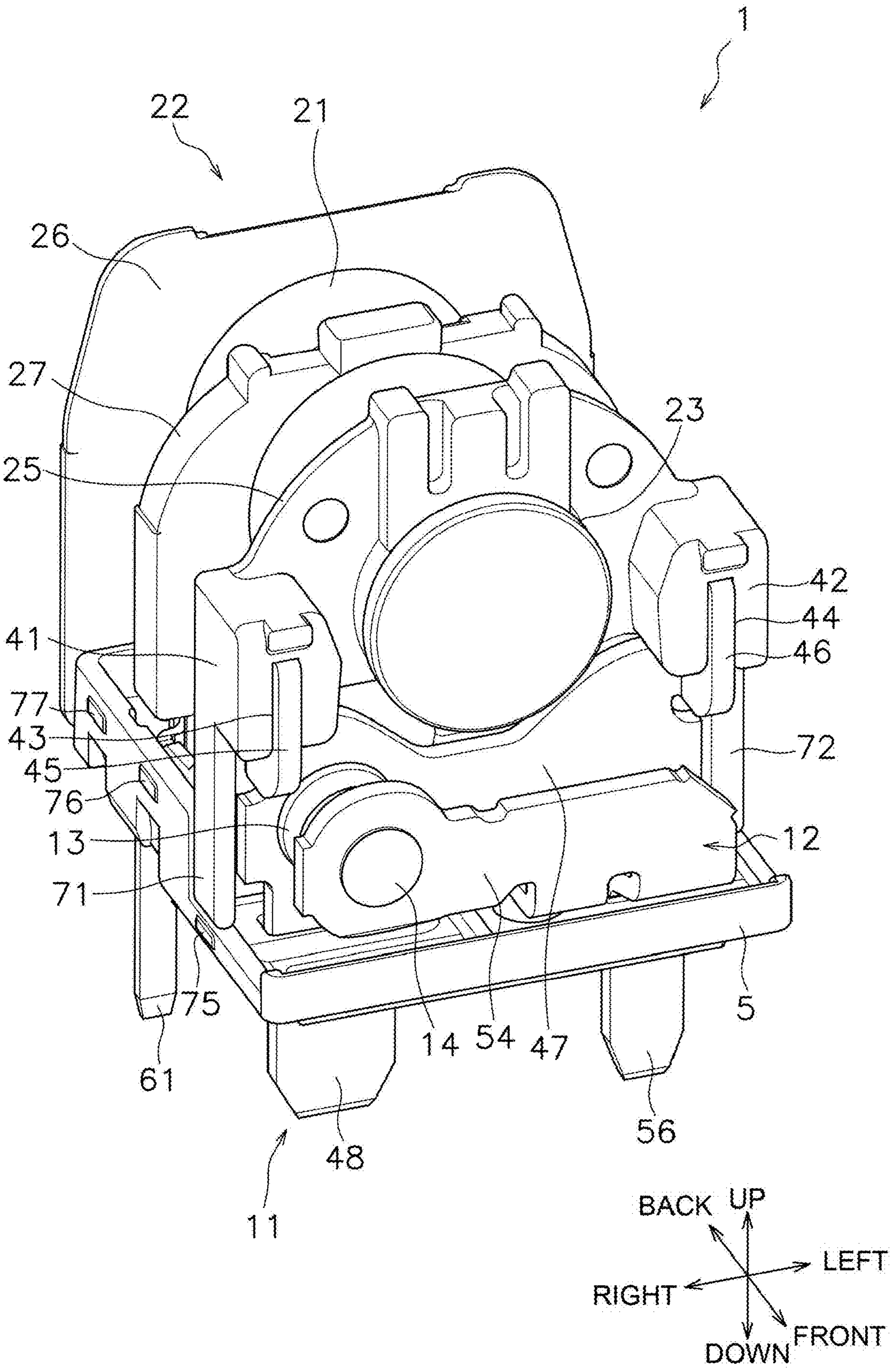
FIG. 4 is a perspective view of the electromagnetic relay with a common terminal, a movable piece, and an armature omitted.
Figure 5:
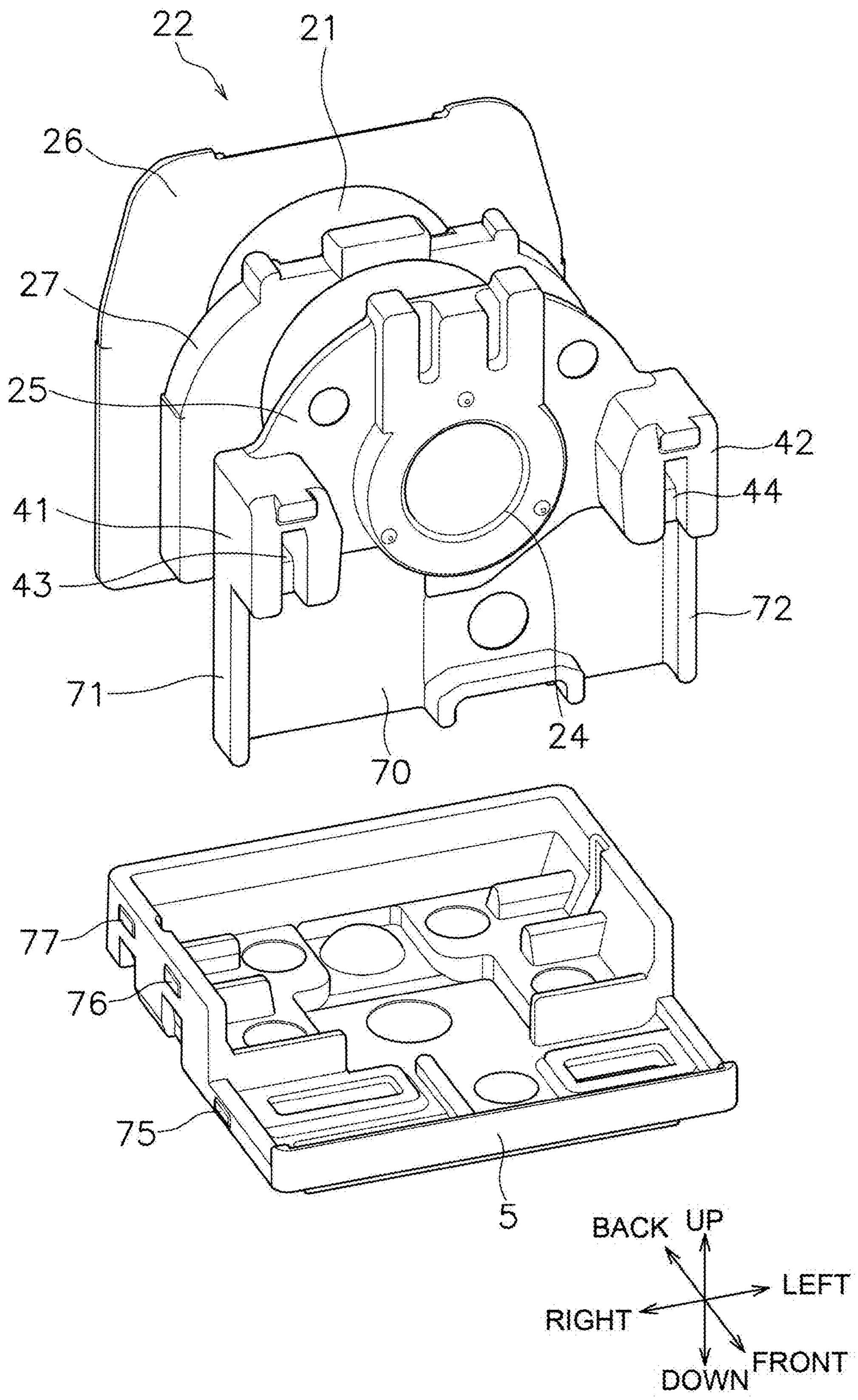
FIG. 5 is an exploded perspective view of a spool and a base.

FIG. 4 is a perspective view of the electromagnetic relay 1 with the case 6, the yoke 15, the movable piece 16, and the armature 17 omitted. FIG. 5 is an exploded perspective view of the spool 22 and the base 5. As shown in FIGS. 4 and 5, the spool 22 includes a first support portion 41 and a second support portion 42. The first support portion 41 is provided on the first flange 25. The first support portion 41 and the second support portion 42 are formed integrally with the first flange 25. The first support portion 41 and the second support portion 42 support the first fixed terminal 11.

The first support portion 41 protrudes forward from the first flange 25. The first support portion 41 is disposed to the right of the hole 24 of the spool 22. The first support portion 41 supports the first fixed terminal 11. The first support portion 41 is located at the same height as the central axis A1 of the coil 21. The upper end of the first support portion 41 is located above the central axis A1 of the coil 21. The first support portion 41 includes a first groove 43. The first groove 43 extends in the up-down direction in the first support portion 41.

The second support portion 42 is disposed apart from the first support portion 41 in the left-right direction. The second support portion 42 is provided on the first flange 25. The second support portion 42 protrudes forward from the first flange 25. The second support portion 42 is disposed to the left of the hole 24 of the spool 22. The second support portion 42 supports the first fixed terminal 11. The second support portion 42 is located at the same height as the central axis A1 of the coil 21. The upper end of the second support portion 42 is located above the central axis A1 of the coil 21. The second support portion 42 includes a second groove 44. The second groove 44 extends in the up-down direction in the second support portion 42.

Figure 6:
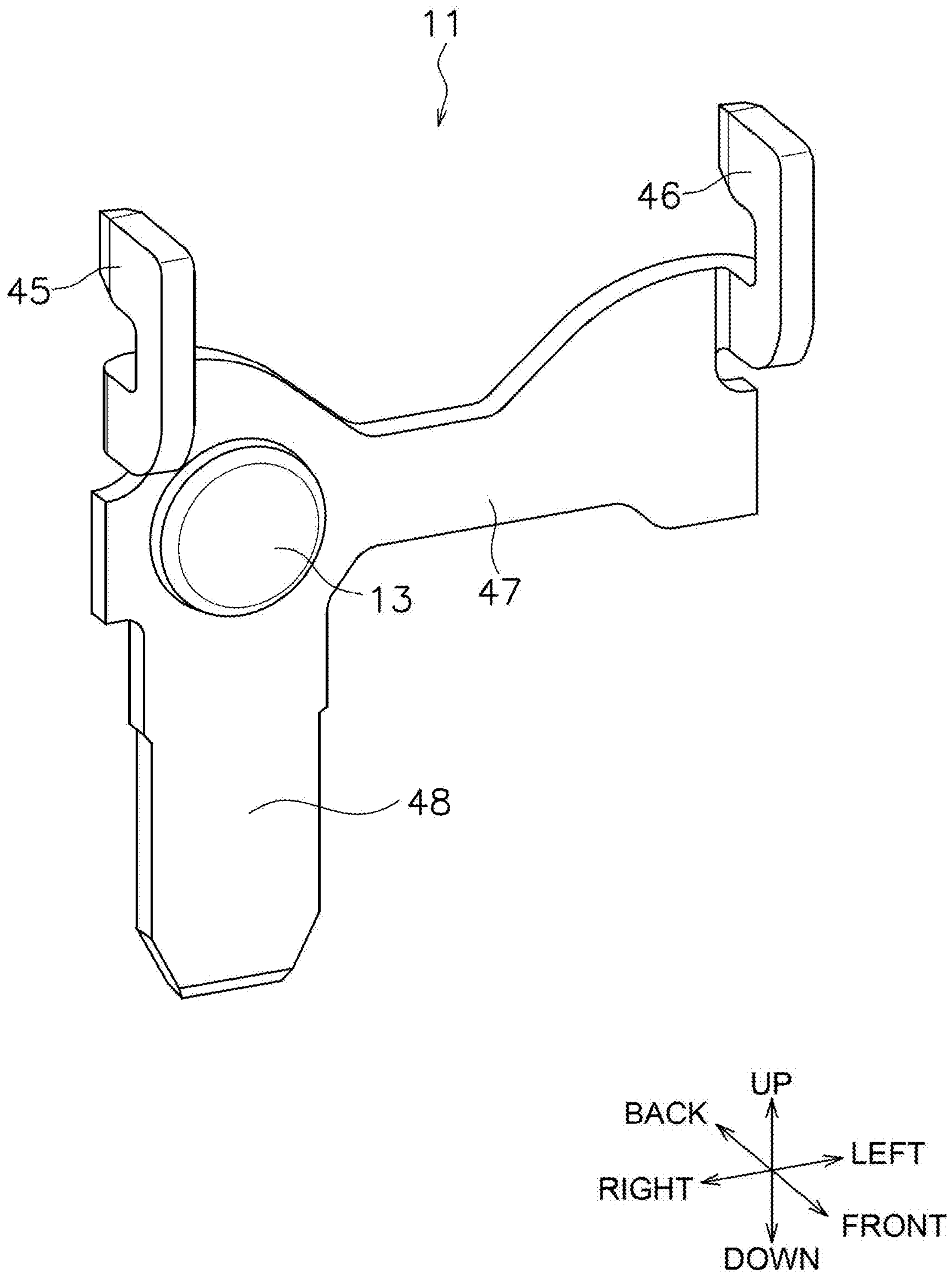
FIG. 6 is a perspective view of a first fixed terminal.

FIG. 6 is a perspective view of the first fixed terminal 11. As shown in FIG. 6, the first fixed terminal 11 includes a first locking portion 45, a second locking portion 46, a first contact support portion 47, and a first external terminal portion 48. The first locking portion 45 extends in the front-rear direction and the up-down direction. The first locking portion 45 is press-fitted into the first groove 43. The first fixed terminal 11 is thereby attached to the first support portion 41. The second locking portion 46 extends in the front-rear direction and the up-down direction. The second locking portion 46 is press-fitted into the second groove 44. The first fixed terminal 11 is thereby attached to the second support portion 42.

The first contact support portion 47 extends in the left-right direction. The first contact support portion 47 connects the first locking portion 45 and the second locking portion 46. The first fixed contact 13 is provided on the first contact support portion 47. The first external terminal portion 48 extends downward from the first contact support portion 47. The first external terminal portion 48 protrudes from the base 5 to the exterior of the electromagnetic relay 1.

Figure 7:
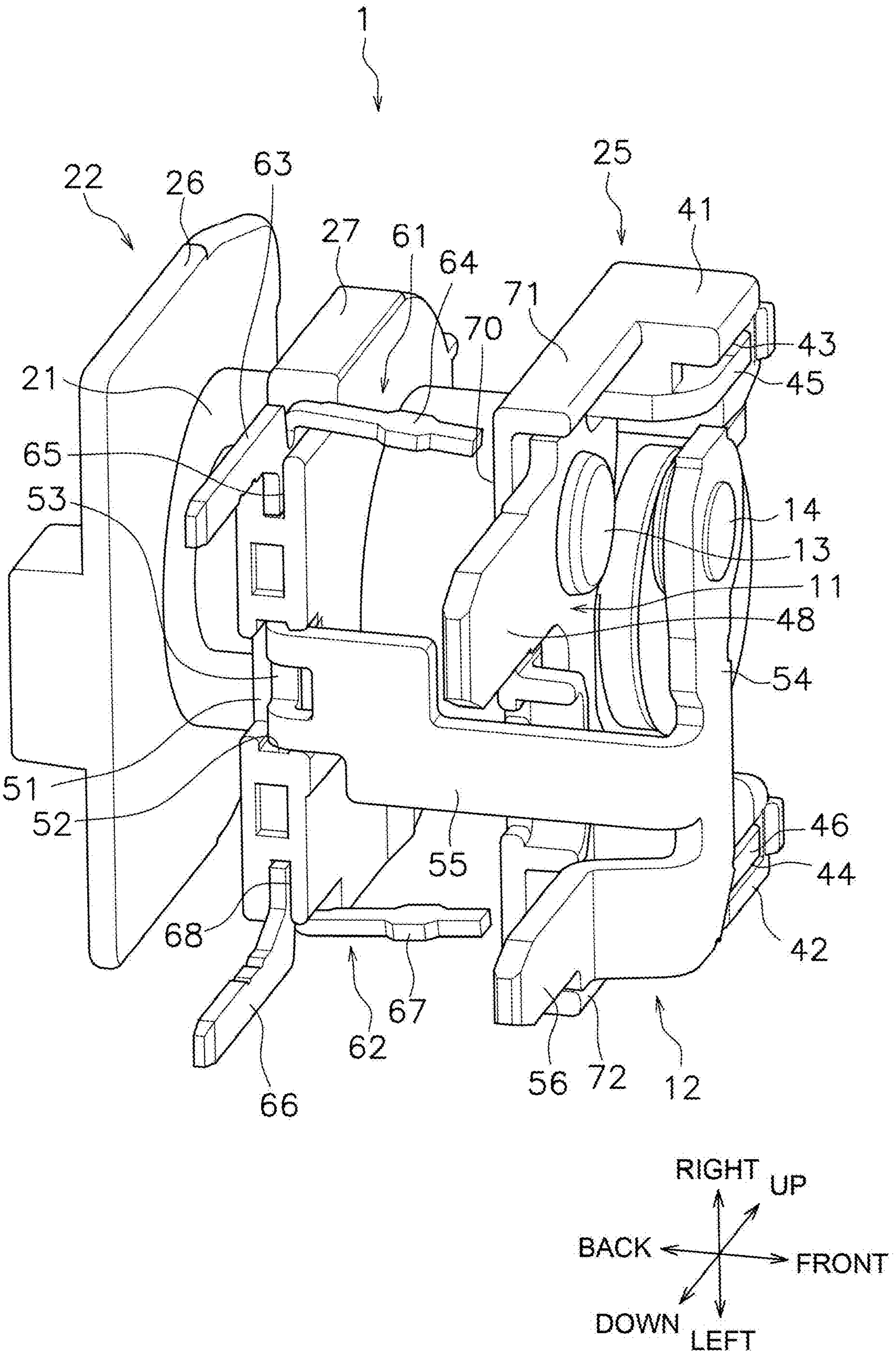
FIG. 7 is a perspective view of the electromagnetic relay from below, with the common terminal, the movable piece, and the armature omitted.

FIG. 7 is a perspective view of the electromagnetic relay 1 from below, with the housing 2, the yoke 15, the movable piece 16, and the armature 17 omitted. As shown in FIG. 7, the spool 22 includes a third support portion 51. The third support portion 51 is provided on the central flange 27. The third support portion 51 supports the second fixed terminal 12. The third support portion 51 includes a third groove 52. The third groove 52 is provided on the bottom surface of the central flange 27.

Figure 8:
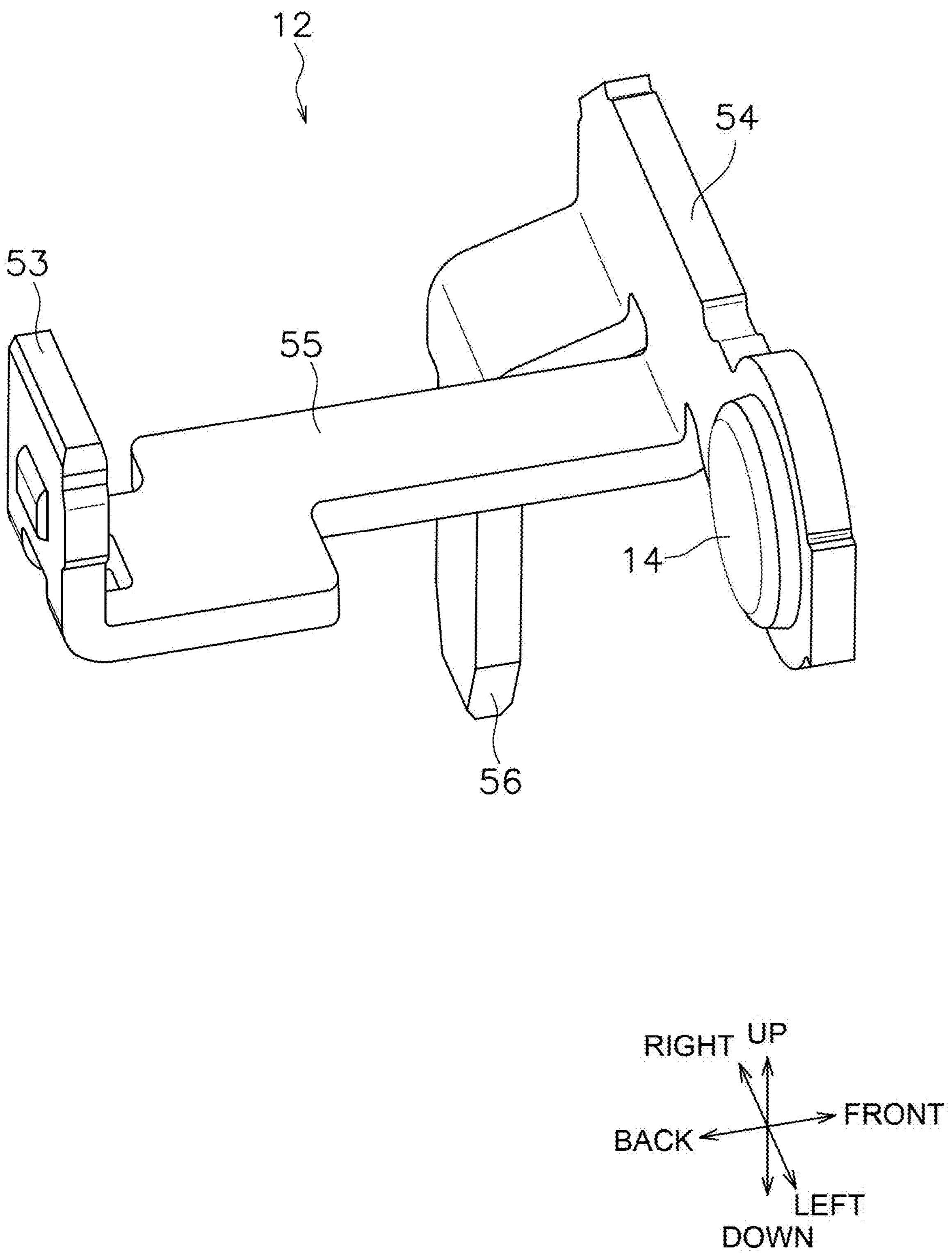
FIG. 8 is a perspective view of a second fixed terminal.

FIG. 8 is a perspective view of the second fixed terminal 12. As shown in FIG. 8, the second fixed terminal 12 includes a third locking portion 53, a second contact support portion 54, a connecting portion 55, and a second external terminal portion 56. The third locking portion 53 extends in the up-down direction. The third locking portion 53 is press-fitted into the third groove 52. The second fixed terminal 12 is thereby attached to the third support portion 51. The second contact support portion 54 extends in the left-right direction. The second fixed contact 14 is provided on the second contact support portion 54. The connecting portion 55 extends in the front-rear direction. The connecting portion 55 connects the third locking portion 53 and the second contact support portion 54 together. The second external terminal portion 56 extends downward from the second contact support portion 54. The second external terminal portion 56 protrudes from the base 5 to the exterior of the electromagnetic relay 1.

Figure 9:
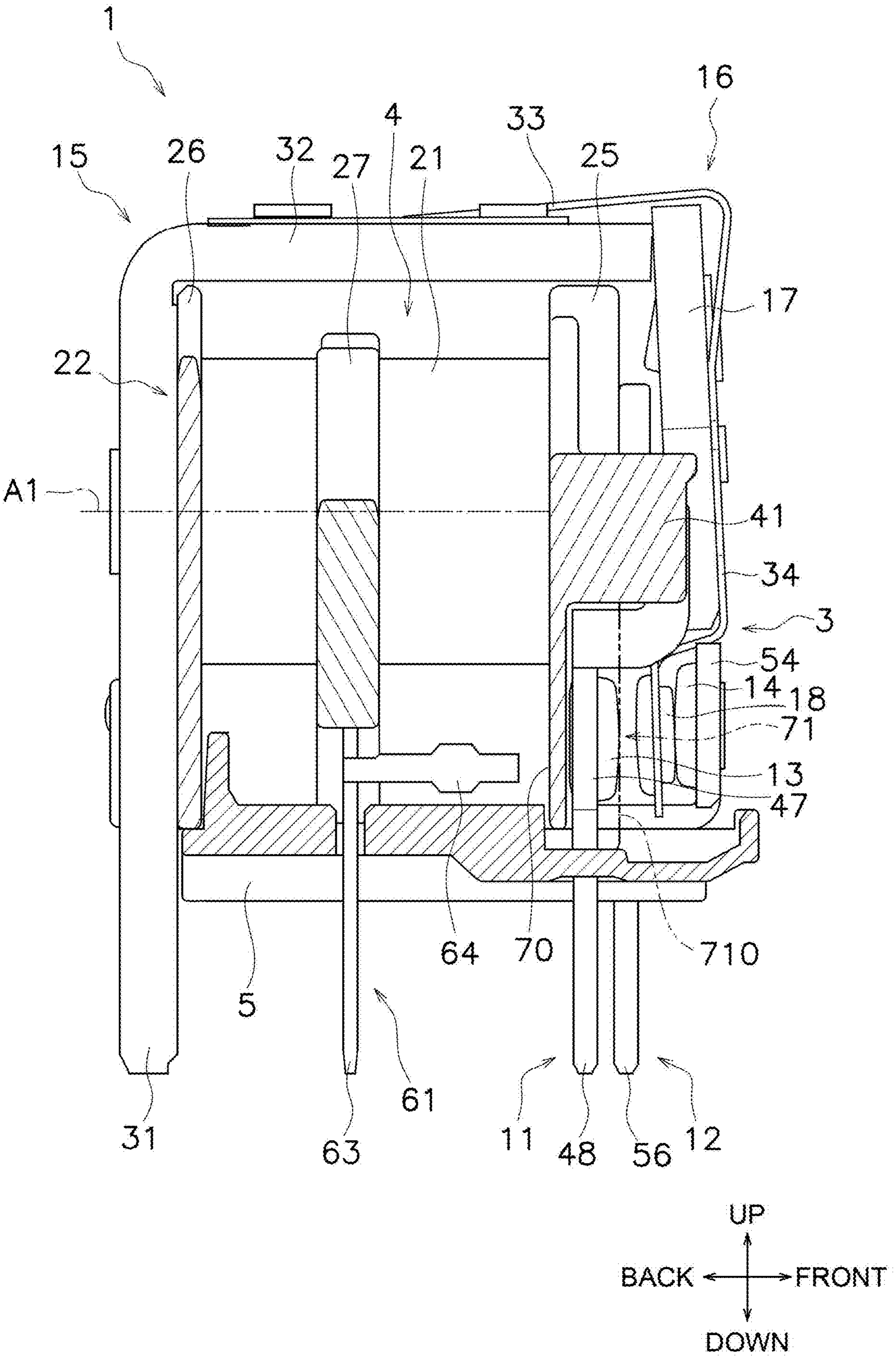
FIG. 9 is a side view of the electromagnetic relay.
Figure 10:
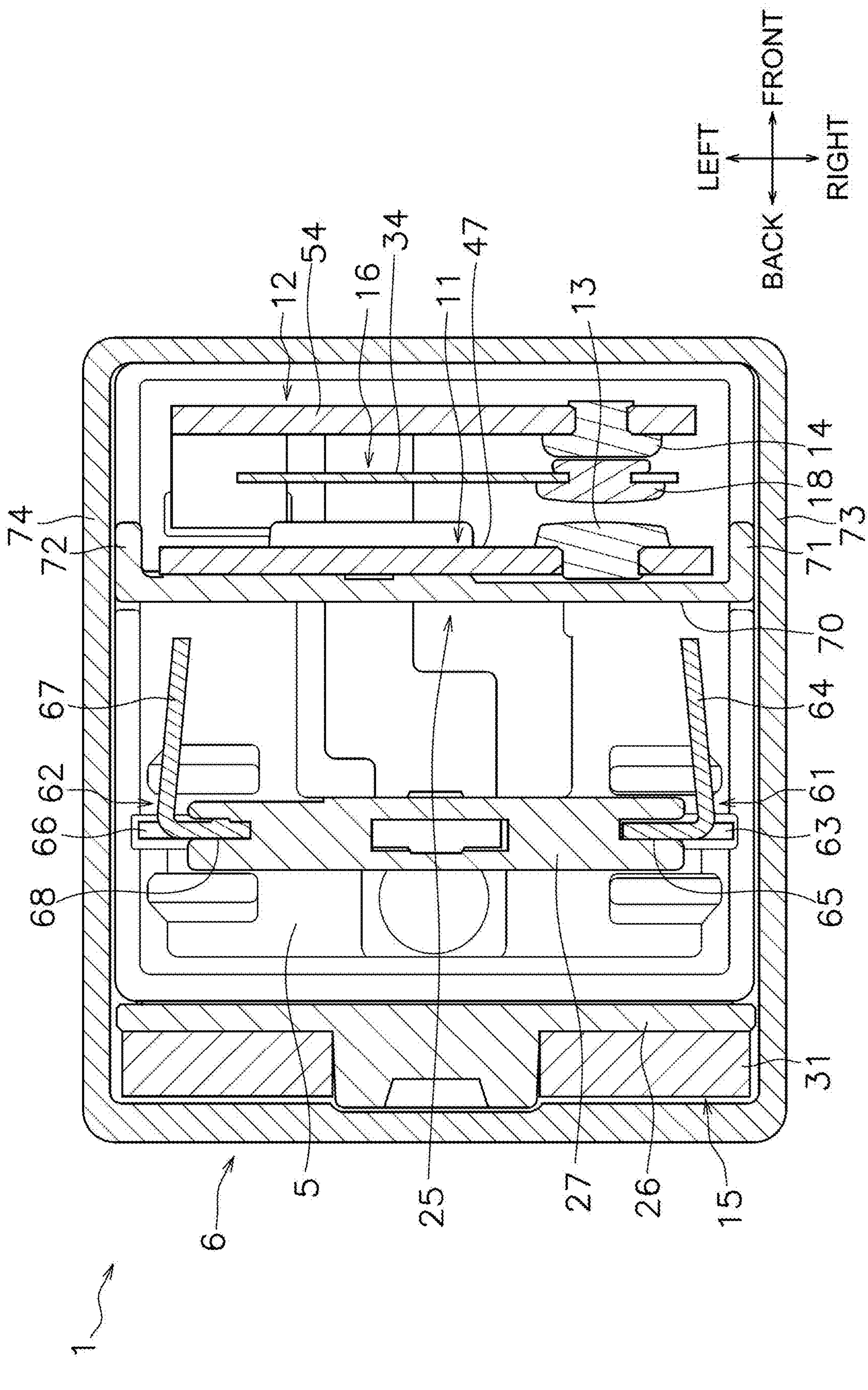
FIG. 10 is a cross-sectional top view of the electromagnetic relay.

FIG. 9 is a side view of the electromagnetic relay 1. In FIG. 9, a part of the spool 22 is shown in cross section. FIG. 10 is a cross-sectional top view of the electromagnetic relay 1. As shown in FIGS. 9 and 10, the electromagnetic relay 1 includes a first coil terminal 61 and a second coil terminal 62. The first coil terminal 61 and the second coil terminal 62 are connected to the coil 21. The first coil terminal 61 and the second coil terminal 62 are attached to the central flange 27. The first coil terminal 61 and the second coil terminal 62 are disposed between the first fixed terminal 11 and the common terminal 31. It should be noted that case 6 is omitted in FIG. 9.

As shown in FIG. 9, the first coil terminal 61 includes a first body portion 63 and a first tie-down portion 64. The first body portion 63 is supported by the central flange 27. The first body portion 63 extends downward from the central flange 27. The first body portion 63 protrudes from the base 5 to the exterior of the electromagnetic relay 1.

The first tie-down portion 64 is formed integrally with the first body portion 63. The first tie-down portion 64 is bent relative to the first body portion 63. The first tie-down portion 64 extends forward from the first body portion 63 along the axial direction of the coil 21. The first tie-down portion 64 extends from the first body portion 63 toward the first flange 25. The first tie-down portion 64 extends from the first body portion 63 toward the first fixed terminal 11. A first end of the coil 21 is wound around the first tie-down portion 64 to secure and electrically connect that end of the coil 21 to the first coil terminal 61.

The second coil terminal 62 has a similar shape to the first coil terminal 61. The second coil terminal 62 is disposed away from the first coil terminal 61 in the left-right direction. The second coil terminal 62 includes a second body portion 66 and a second tie-down portion 67. The second body portion 66 and the second tie-down portion 67 have the same shapes as the first body portion 63 and the first tie-down portion 64, respectively. A second end of the coil 21 is wound around the second tie-down portion 67 to secure and electrically connect that second end of the coil 21 to the second coil terminal 62.

As shown in FIG. 10, the central flange 27 includes a fourth groove 65 and a fifth groove 68. The fourth groove 65 and the fifth groove 68 are disposed to the left and right of the third groove 52. The first body portion 63 is press-fitted into the fourth groove 65. The first coil terminal 61 is thereby attached to the central flange 27. The second body portion 66 is press-fitted into the fifth groove 68. The second coil terminal 62 is thereby attached to the central flange 27.

As shown in FIG. 5, the first flange 25 includes a vertical wall portion 70, a first lateral wall portion 71, and a second lateral wall portion 72. The vertical wall portion 70 extends in the left-right direction. The vertical wall portion 70 extends upward from the base 5. The vertical wall portion 70 is disposed behind the first fixed terminal 11. The vertical wall portion 70 is disposed between the first fixed terminal 11 and the first tie-down portion 64. The vertical wall portion 70 is disposed between the first fixed terminal 11 and the second tie-down portion 67.

The first lateral wall portion 71 is bent relative to the vertical wall portion 70. The first lateral wall portion 71 is disposed laterally outward of the first contact support portion 47 of the first fixed terminal 11. The first lateral wall portion 71 covers the first contact support portion 47 from the laterally outer side. In a side view, the first lateral wall portion 71 overlaps with the first contact support portion 47. The first lateral wall portion 71 is disposed laterally outward of the first fixed contact 13. The first lateral wall portion 71 covers the first fixed contact 13 from the laterally outer side. In a side view, the first lateral wall portion 71 overlaps the first fixed contact 13. The first lateral wall portion 71 is disposed at a non-overlapping position with the second contact support portion 54 in a side view. The first lateral wall portion 71 is disposed at a non-overlapping position with the second fixed contact 14 in a side view.

The first lateral wall portion 71 extends forward from the vertical wall portion 70. In FIG. 9, the two-dot chain line indicates the position of the front end 710 of the first lateral wall portion 71. As shown in FIGS. 9 and 10, the first lateral wall portion 71 extends forward from the vertical wall portion 70 to a position beyond the first fixed terminal 11. The front end 710 of the first lateral wall portion 71 is located between the first fixed terminal 11 and the second fixed terminal 12. The front end 710 of the first lateral wall portion 71 is located between the first fixed contact 13 and the second fixed contact 14. The position between first fixed contact 13 and second fixed contact 14 is a position from a position aligned with the contact surface of first fixed contact 13 to a position aligned with the contact surface of second fixed contact 14 in a side view. In the present embodiment, the front end 710 of the first lateral wall portion 71 is located in a position aligned with the contact surface of the first fixed contact 13 in a side view.

As shown in FIG. 3, the first lateral wall portion 71 extends downward from the first support portion 41. The first lateral wall portion 71 is shorter than the first support portion 41 in the front-rear direction. That is, the first support portion 41 is longer than the first lateral wall portion 71 in the front-rear direction.

As shown in FIG. 10, the case 6 includes a first side surface 73 and a second side surface 74. The first side surface 73 and the second side surface 74 are disposed apart from each other in the left-right direction. The first side surface 73 covers the first fixed terminal 11 and the second fixed terminal 12 from the right side. The second side surface 74 covers the first fixed terminal 11 and the second fixed terminal 12 from the left side. The first lateral wall portion 71 is disposed between the first fixed terminal 11 and the first side surface 73. In detail, the first lateral wall portion 71 is disposed between the first contact support portion 47 and the first side surface 73 of the first fixed terminal 11.

Figure 11:
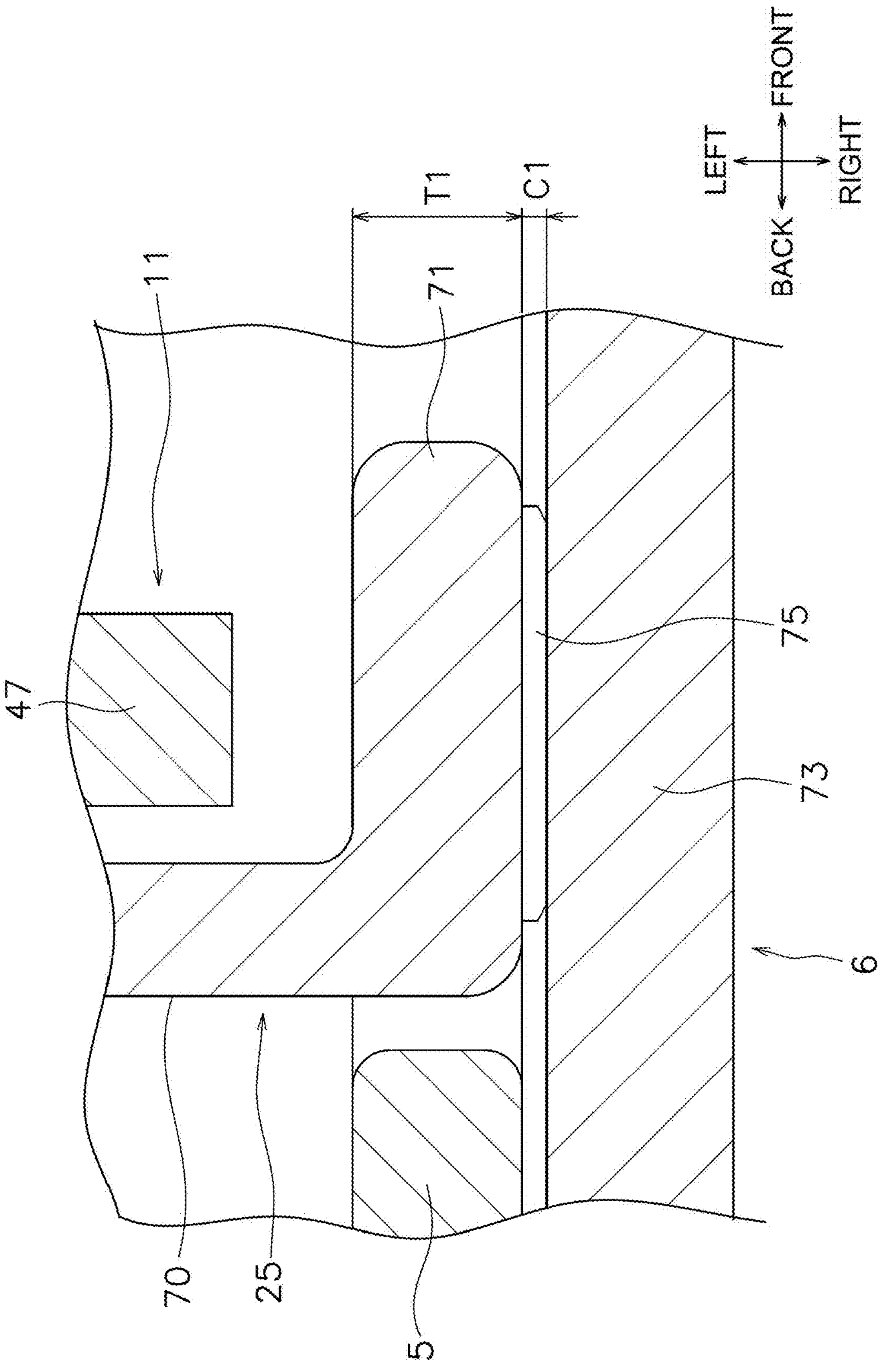
FIG. 11 is an enlarged view of a portion of FIG. 10.

FIG. 11 is an enlarged view of a portion of FIG. 10. As shown in FIG. 11, a clearance C1 is provided between the first side surface 73 of the case 6 and the first lateral wall portion 71. As shown in FIG. 2, protrusions 75 to 77 are provided on a side surface of the base 5. As shown in FIG. 11, the protrusions 75 to 77 come into contact with the first side surface 73, thereby providing the clearance C1 between the first side surface 73 and the first lateral wall portion 71.

The second lateral wall portion 72 has the same shape as the first lateral wall portion 71. The second lateral wall portion 72 is disposed symmetrically to the first lateral wall portion 71. Although not shown, a clearance is provided between the second side surface 74 and the second lateral wall portion 72, similar to the first side surface 73 and the first lateral wall portion 71.

The vertical wall portion 70 and the first lateral wall portion 71 described above increase the insulation distance between the first coil terminal 61 and the first fixed terminal 11. In addition, the vertical wall portion 70 and the second lateral wall portion 72 provide an insulation distance between the second coil terminal 62 and the first fixed terminal 11.

In the electromagnetic relay 1 described above, the electromagnetic relay 1 operates when electricity is applied to the coil 21 via the first coil terminal 61 and the second coil terminal 62. The operation of the electromagnetic relay 1 will now be described.

In the electromagnetic relay 1, when the coil 21 is not energized, as shown in FIG. 9, the elastic force of the contact piece keeps the armature 17 away from the iron core 23 and urges the movable contact 18 toward the second fixed contact 14. As a result, the movable contact 18 is separated from the first fixed contact 13 and is in contact with the second fixed contact 14.

Figure 12:
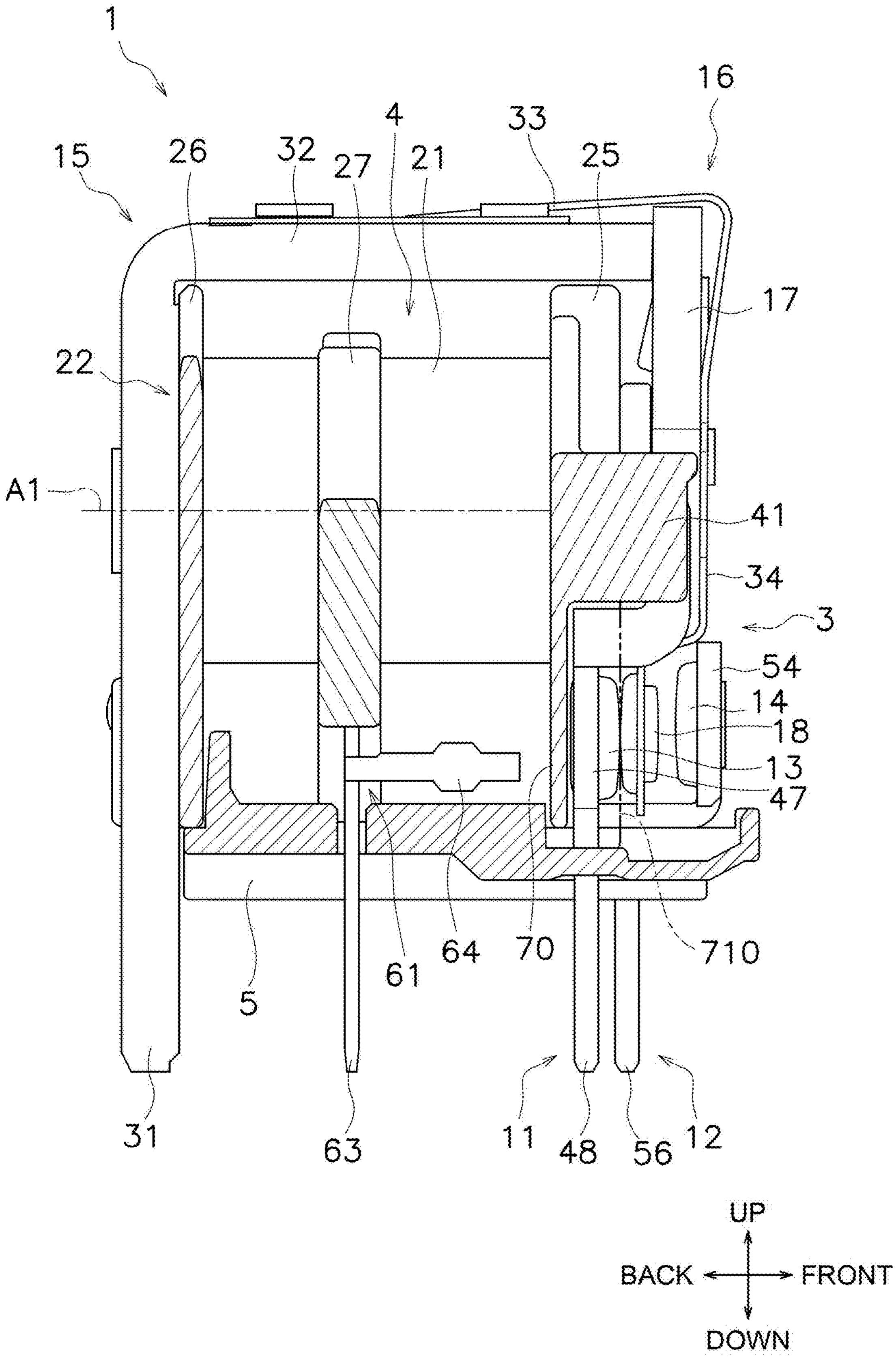
FIG. 12 is a side view of the electromagnetic relay.

When the coil 21 is energized, the magnetic field generated by the coil 21 generates a magnetic force, which attracts the armature 17 to the iron core 23. This causes the movable piece 16 to elastically deform, and the movable support portion 34 moves toward the first fixed terminal 11. As a result, as shown in FIG. 12, the movable contact 18 moves away from the second fixed contact 14 and comes into contact with the first fixed contact 13.

When the current supply to the coil 21 is turned off, the elastic force of the movable piece 16 causes the movable support portion 34 to move toward the second fixed contact 14. As a result, the armature 17 moves away from the iron core 23. As a result, as shown in FIG. 9, the movable contact 18 moves away from the first fixed contact 13 and comes into contact with the second fixed contact 14.

In the embodiment of an electromagnetic relay 1 described above, as shown in FIG. 9, in the first coil terminal 61, the first tie-down portion 64 extends forward from the first body portion 63 along the coil 21. Therefore, the first coil terminal 61 is disposed compactly together with the coil 21. Further, the vertical wall portion 70 of the first flange 25 is located between the first fixed terminal 11 and the first tie-down portion 64. Therefore, the insulation distance between the first fixed terminal 11 and the first tie-down portion 64 becomes longer. In addition, the first lateral wall portion 71 extends forward from the vertical wall portion 70. Therefore, the insulation distance between the first fixed terminal 11 and the first tie-down portion 64 becomes even longer. This improves the insulation between the first fixed terminal 11 and the first coil terminal 61. Similarly, the second lateral wall portion 72 increases the insulation distance between the first fixed terminal 11 and the second tie-down portion 67. This improves the insulation between the first fixed terminal 11 and the second coil terminal 62.

As shown in FIG. 11, in the electromagnetic relay 1, the creepage distance between the first fixed terminal 11 and the second fixed terminal 12 is longer by the thickness Tl of the first lateral wall portion 71. This improves the insulation between the first fixed terminal 11 and the second fixed terminal 12 while preventing the electromagnetic relay 1 from becoming too large. In addition, the creepage distance between the first fixed terminal 11 and the second fixed terminal 12 is increased by the clearance C1 between the first lateral wall portion 71 and the first side surface 73. This improves the insulation between the first fixed terminal 11 and the second fixed terminal 12.

Although one embodiment of the claimed invention has been described above, the claimed invention is not limited to the above embodiment, and various modifications are possible without departing from the scope of the claimed invention.

The shapes of the first fixed terminal 11, the second fixed terminal 12, and the common terminal 31 are not limited to those in the above-described embodiment and may be modified. The shape of the movable piece 16 is not limited to that in the above-described embodiment and may be changed. The shape of the spool 22 is not limited to that in the above-described embodiment and may be modified. For example, the second fixed terminal 12 may be supported by the first flange 25. The second fixed contact 14 of the second fixed terminal 12 may be omitted. In that case, the second external terminal portion 56 may be omitted, and the second fixed terminal 12 may be used as a dummy terminal. The common terminal 31 may not be integrated with the yoke 15 but may be separate therefrom. The common terminal 31 may be integrated with the movable piece 16.

Figure 13:
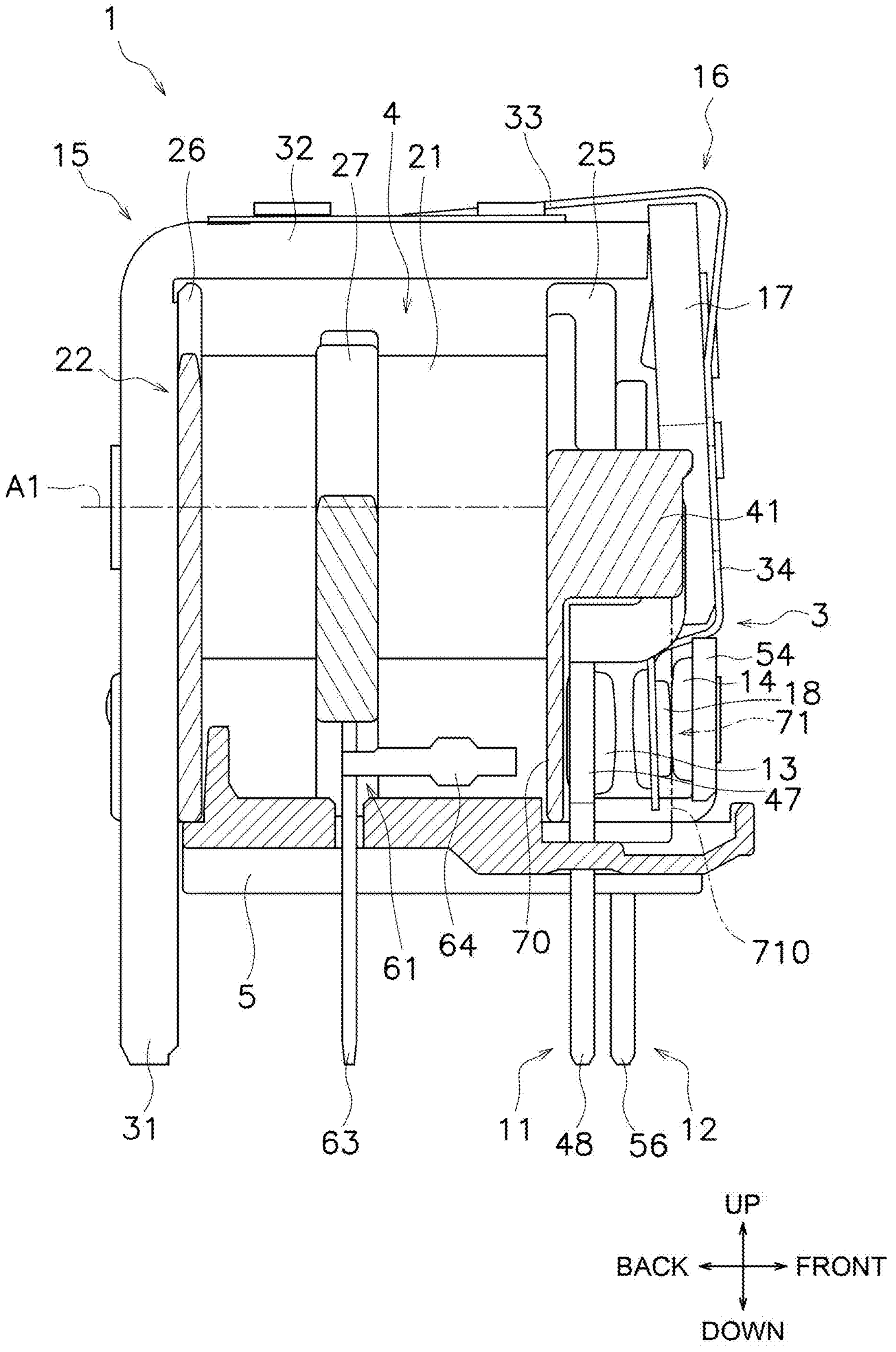
FIG. 13 is a side view of an electromagnetic relay according to an exemplary first modified embodiment.

The shape of the first lateral wall portion 71 is not limited to that in the above-described embodiment and may be modified. For example, FIG. 13 is a side view of an electromagnetic relay 1 according to a first exemplary modified embodiment. As shown in FIG. 13, the first lateral wall portion 71 may extend to a position aligned with the contact surface of the second fixed contact 14. Alternatively, the first lateral wall portion 71 may extend between a position aligned with the contact surface of the first fixed contact 13 and a position aligned with the contact surface of the second fixed contact 14. The shape of the second lateral wall portion 72 may also be changed in the same manner as the first lateral wall portion 71.

The shapes of the base 5 and the case 6 are not limited to those in the above-described embodiment and may be modified. For example, the above-mentioned first side surface 73 may be provided on the base 5 instead of the case 6. That is, the first lateral wall portion 71 may be disposed between the first fixed terminal 11 and the side surface of the base 5 in the left-right direction. The second side surface 74 may also be provided on the base 5, similar to the first side surface 73. The above-mentioned protrusions 75 to 77 may be provided on the case 6 or the spool 22 instead of on the base 5.

Figure 14:
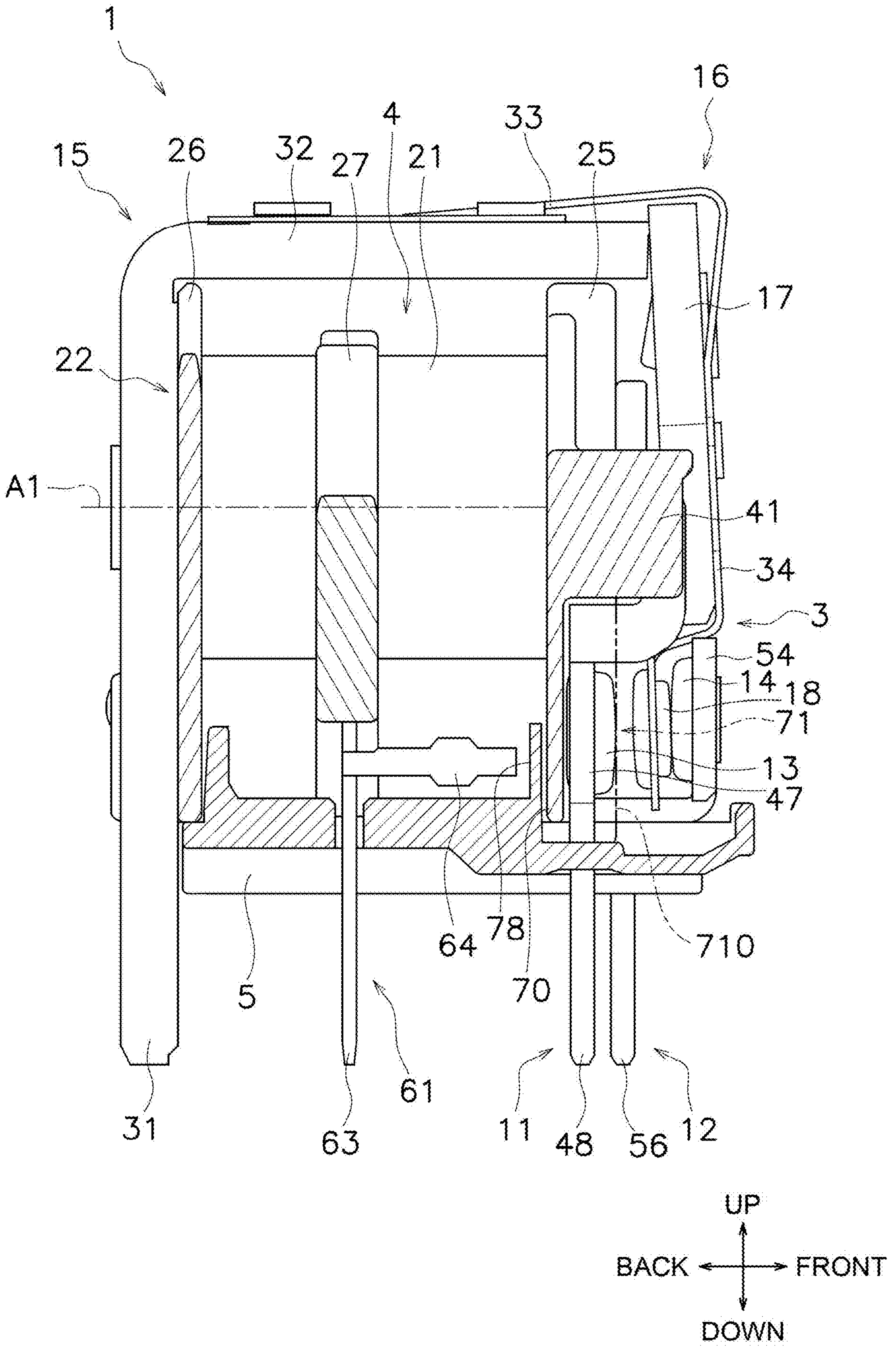
FIG. 14 is a cross-sectional side view of an electromagnetic relay according to an exemplary second modified embodiment.
Figure 15:
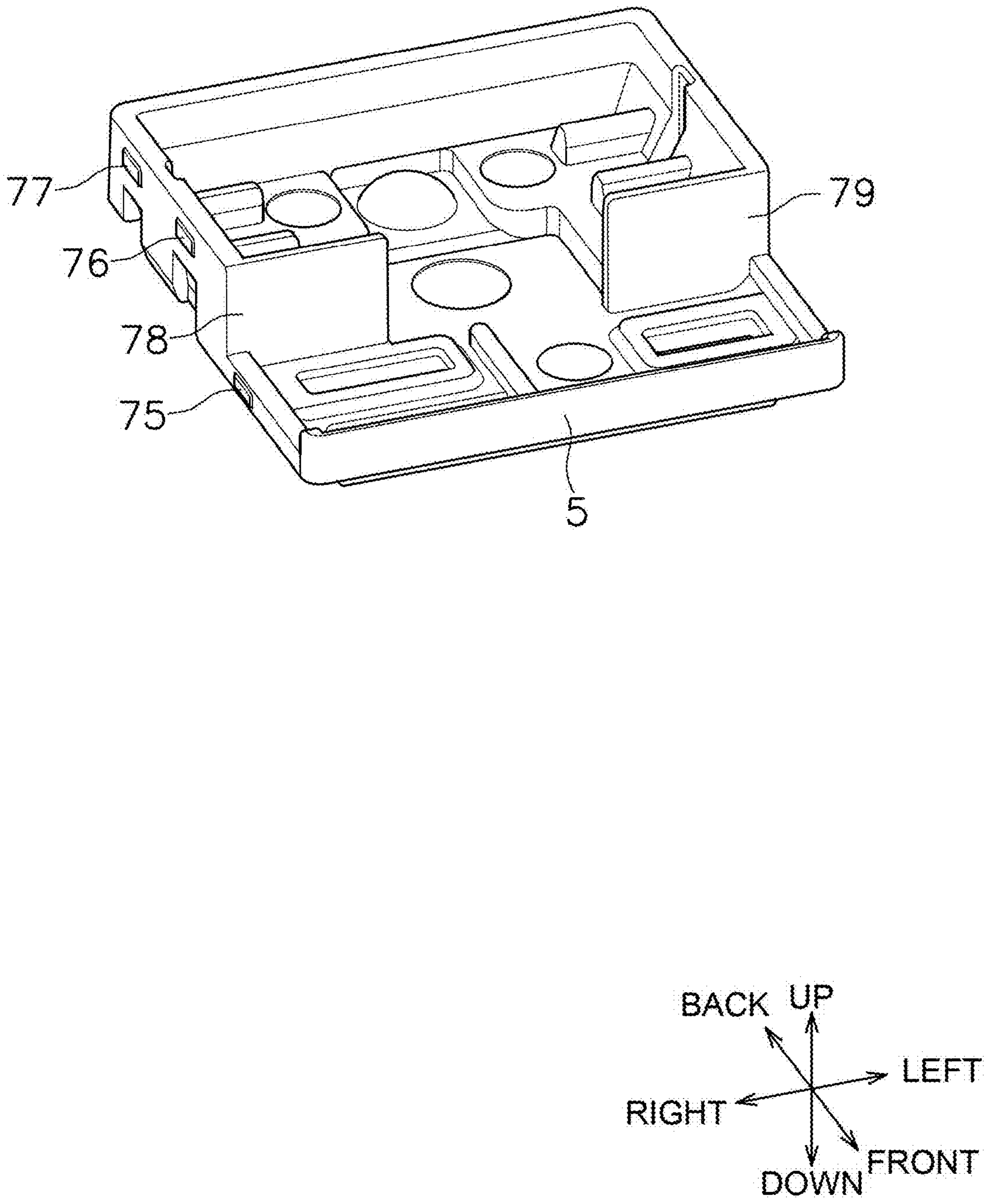
FIG. 15 is a perspective view of a base of the electromagnetic relay according to the second modified embodiment.

FIG. 14 is a cross-sectional side view of an electromagnetic relay 1 according to a second exemplary modified embodiment. FIG. 15 is a perspective view of the base of the electromagnetic relay 1 according to the second modified embodiment. As shown in FIGS. 14 and 15, the base 5 may include a first base wall portion 78. The first base wall portion 78 may be disposed between the first fixed terminal 11 and the first tie-down portion 64. This further increases the insulation distance between the first coil terminal 61 and the first fixed terminal 11. The base 5 may include a second base wall portion 79. The second base wall portion 79 may be disposed between the first fixed terminal 11 and the second tie-down portion 67. This further increases the insulation distance between the second coil terminal 62 and the first fixed terminal 11.

Figure 16:
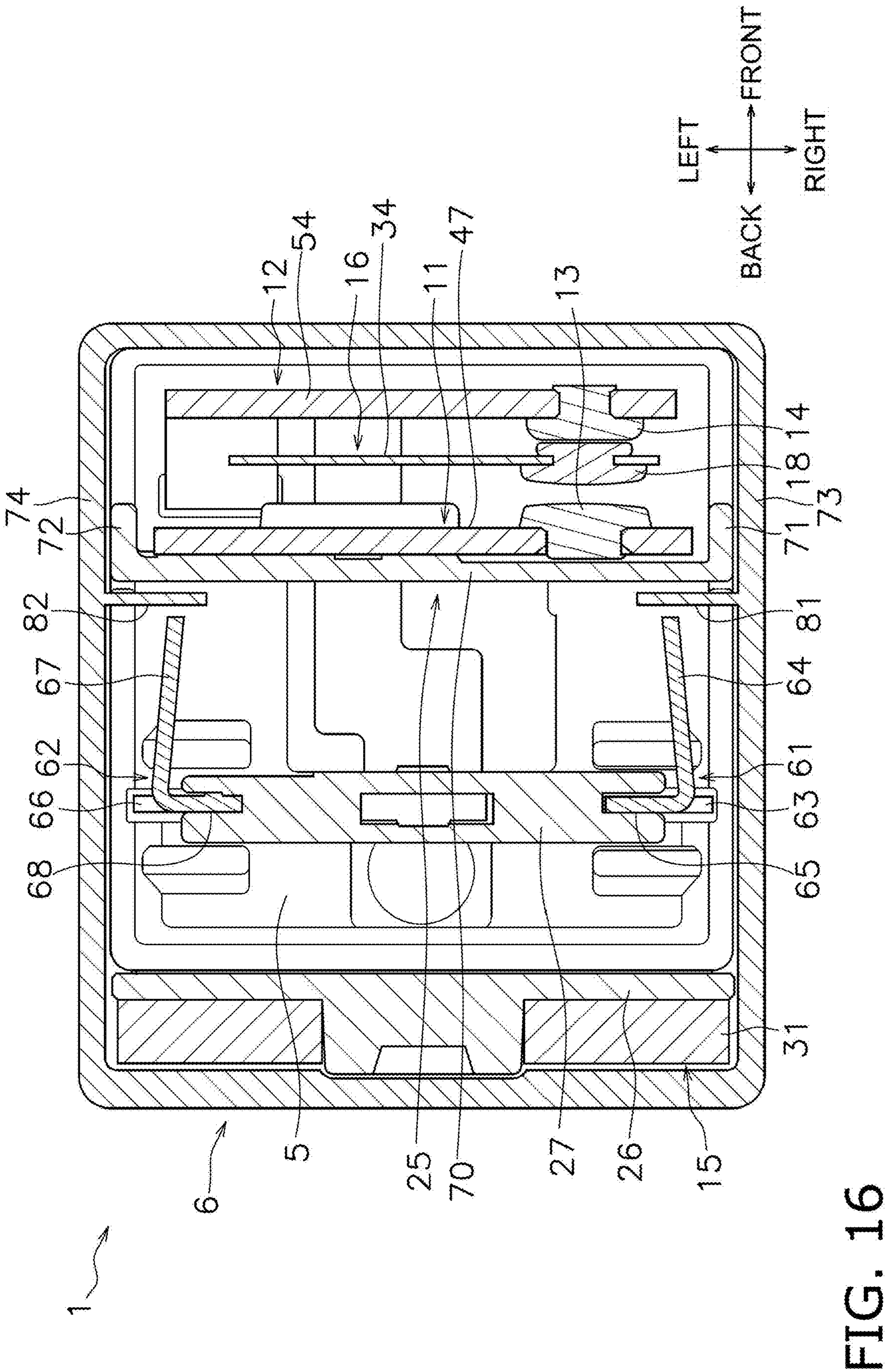
FIG. 16 is a sectional top view of an electromagnetic relay according to a third exemplary modified embodiment.

FIG. 16 is a sectional top view of an electromagnetic relay 1 according to a third exemplary modified embodiment. As shown in FIG. 16, the case 6 may include a first case wall portion 81. The first case wall portion 81 may be disposed between the first fixed terminal 11 and the first tie-down portion 64. This further increases the insulation distance between the first coil terminal 61 and the first fixed terminal 11. The case 6 may include a second case wall portion 82. The second case wall portion 82 may be disposed between the first fixed terminal 11 and the second tie-down portion 67. This further increases the insulation distance between the second coil terminal 62 and the first fixed terminal 11.

Figure 17:
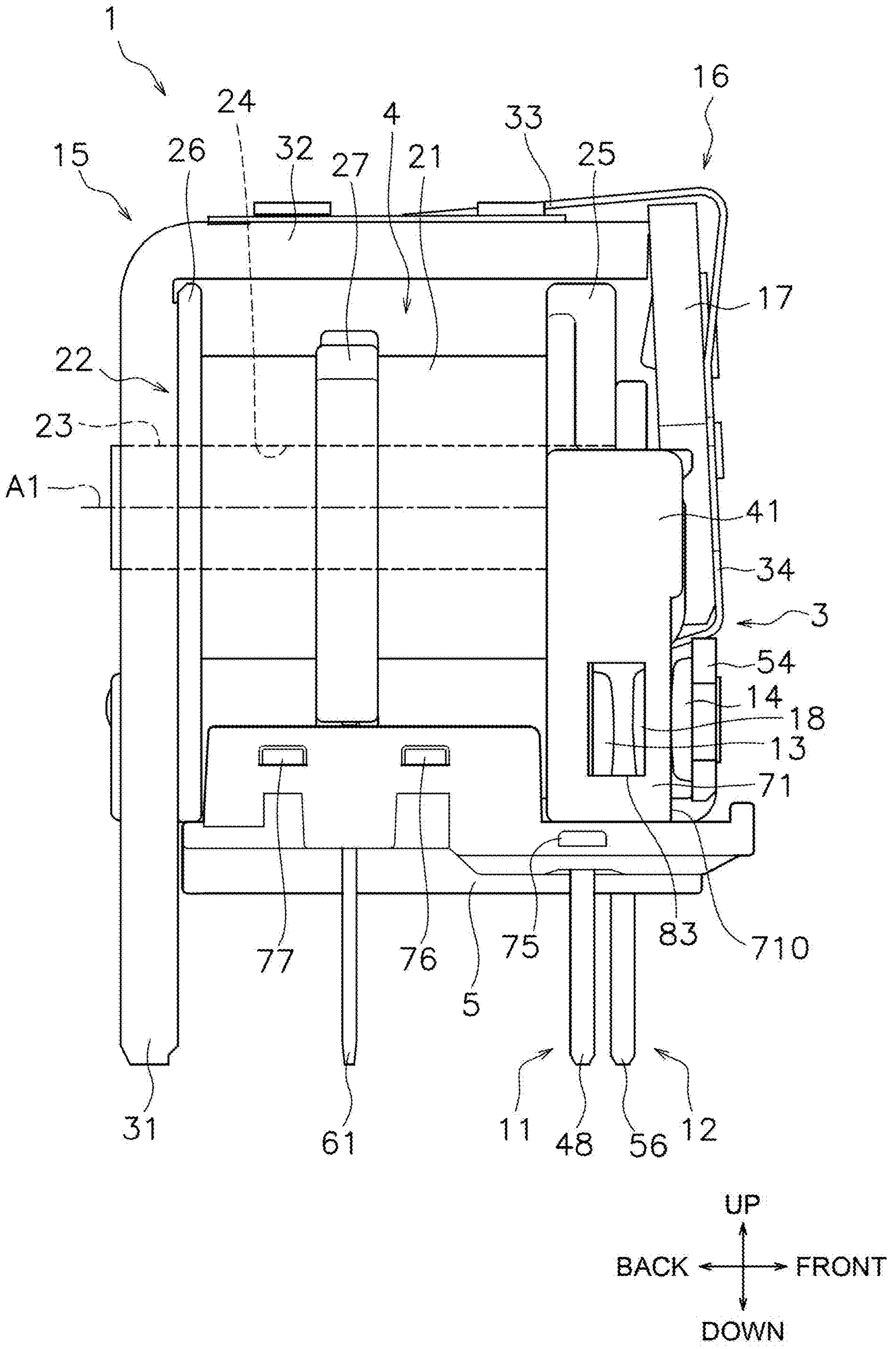
FIG. 17 is a side view of an electromagnetic relay according to an exemplary fourth modified embodiment.

FIG. 17 is a side view of the electromagnetic relay 1 according to the fourth exemplary modified embodiment. As shown in FIG. 17, the first lateral wall portion 71 may include an opening 83. In this case, wear particles and the like can escape through the opening 83. This suppresses deterioration of the insulation between the first fixed terminal 11 and the second fixed terminal 12 due to wear particles and the like.

Figure 18:
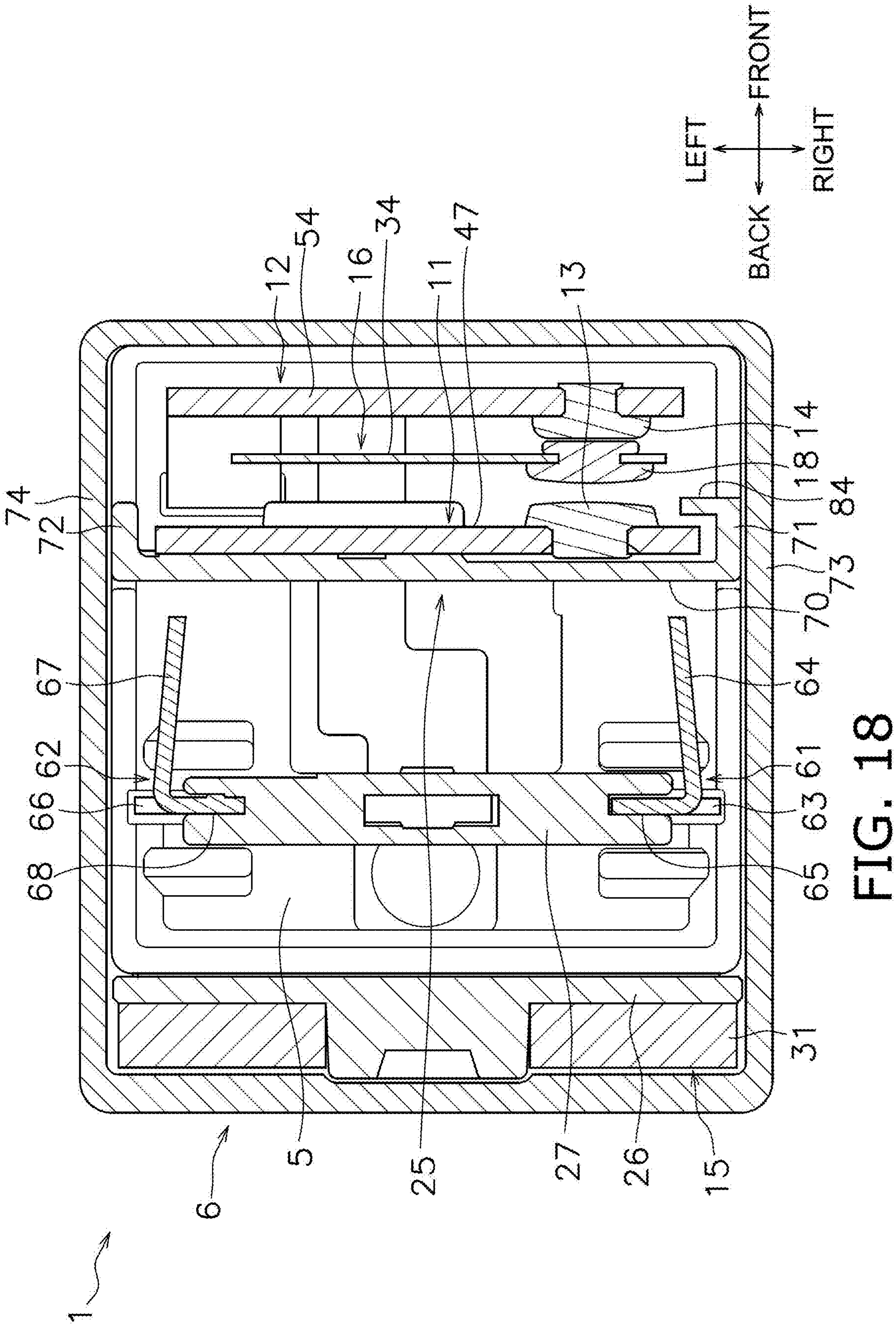
FIG. 18 is a sectional top view of an electromagnetic relay according to an exemplary fifth modified embodiment.

FIG. 18 is a side view of the electromagnetic relay 1 according to the fifth modified embodiment. As shown in FIG. 18, the spool 22 may include a bent portion 84. The bent portion 84 may protrude from the first lateral wall portion 71 toward a position between the first fixed terminal 11 and the second fixed terminal 12. In this case, the bent portion 84 prevents wear particles and the like from scattering forward. This suppresses deterioration of the insulation between the first fixed terminal 11 and the second fixed terminal 12 caused by wear particles and the like.

REFERENCE SIGNS LIST

2: Housing, 11: First fixed terminal, 12: Second fixed terminal, 13: First fixed contact, 14: Second fixed contact, 21: Coil, 22: Spool, 25: First flange, 41: First support portion, 61: First coil terminal, 63: First body portion, 64: First tie-down portion, 70: Vertical wall portion, 71: First lateral wall portion, 83: Opening, 84: Bent portion, C1: Clearance

The invention claimed is:

1. An electromagnetic relay, comprising:
- a first fixed terminal;
- a first fixed contact provided on the first fixed terminal;
- a second fixed terminal disposed in front of the first fixed terminal and facing the first fixed terminal;
- a second fixed contact provided on the second fixed terminal and disposed to face the first fixed terminal;
- a housing including a side surface covering the first fixed terminal and the second fixed terminal from a lateral side thereof;
- a coil; and
- a spool around which the coil is wound, the spool including a support portion supporting the first fixed terminal, and a lateral wall portion extending from the support portion, the lateral wall portion being disposed between the first fixed terminal and the side surface of the housing in a left-right direction of the electromagnetic relay,
- wherein a front end of the lateral wall portion is located between the first fixed terminal and the second fixed terminal in a front-rear direction of the electromagnetic relay, and the front end of the lateral wall portion is located between the first fixed contact and the second fixed contact in the front-rear direction.

2. The electromagnetic relay according to claim 1, wherein the lateral wall portion extends downward from the support portion.

3. An electromagnetic relay, comprising:

a first fixed terminal;

a second fixed terminal disposed in front of the first fixed terminal and facing the first fixed terminal;

a housing including a side surface covering the first fixed terminal and the second fixed terminal from a lateral side thereof;

a coil; and a spool around which the coil is wound, the spool including a support portion supporting the first fixed terminal, and a lateral wall portion extending from the support portion, the lateral wall portion being disposed between the first fixed terminal and the side surface of the housing in a left-right direction of the electromagnetic relay, wherein a front end of the lateral wall portion is located between the first fixed terminal and the second fixed terminal in a front-rear direction of the electromagnetic relay, and wherein the support portion is longer than the lateral wall portion in the front-rear direction.

4. The electromagnetic relay according to claim 1, wherein a clearance is provided between the side surface of the housing and the lateral wall portion.

5. The electromagnetic relay according to claim 1, wherein the lateral wall portion includes an opening.

6. An electromagnetic relay, comprising:

a first fixed terminal;

a second fixed terminal disposed in front of the first fixed terminal and facing the first fixed terminal;

a housing including a side surface covering the first fixed terminal and the second fixed terminal from a lateral side thereof;

a coil; and a spool around which the coil is wound, the spool including a support portion supporting the first fixed terminal, and a lateral wall portion extending from the support portion, the lateral wall portion being disposed between the first fixed terminal and the side surface of the housing in a left-right direction of the electromagnetic relay, wherein a front end of the lateral wall portion is located between the first fixed terminal and the second fixed terminal in a front-rear direction of the electromagnetic relay, and wherein the spool includes a bent portion protruding from the lateral wall portion toward a portion between the first fixed terminal and the second fixed terminal.

7. The electromagnetic relay according to claim 1, further comprising a coil terminal including a body portion supported by the spool and a tie-down portion extending from the body portion toward the first fixed terminal with an end of the coil connected to the tie-down portion to electrically connect the coil to the coil terminal, wherein the spool includes a vertical wall portion located between the first fixed terminal and the tie-down portion in the front-rear direction and the lateral wall portion extends forward from the vertical wall portion.

* * * * *